United States Patent
Huffman et al.

(10) Patent No.: US 11,507,198 B2
(45) Date of Patent: Nov. 22, 2022

(54) GESTURE DETECTION USING EXTERNAL SENSORS

(71) Applicant: Google LLC, Mountain View, CA (US)

(72) Inventors: Katherine Blair Huffman, Mountain View, CA (US); Gregory Granito, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/692,833

(22) Filed: Mar. 11, 2022

(65) Prior Publication Data

US 2022/0221941 A1 Jul. 14, 2022

Related U.S. Application Data

(63) Continuation of application No. 17/139,241, filed on Dec. 31, 2020, now Pat. No. 11,301,052, which is a
(Continued)

(51) Int. Cl.
| | |
|---|---|
| *G06F 3/01* | (2006.01) |
| *G01S 7/41* | (2006.01) |
| *G01S 13/86* | (2006.01) |
| *G06F 3/0346* | (2013.01) |
| *G06F 3/16* | (2006.01) |

(Continued)

(52) U.S. Cl.
CPC .............. *G06F 3/017* (2013.01); *G01S 7/415* (2013.01); *G01S 13/867* (2013.01); *G06F 3/011* (2013.01);
(Continued)

(58) Field of Classification Search
CPC ......... G09G 3/2007; G09G 2300/0842; G09G 2310/0267; G09G 2310/027;
(Continued)

(56) References Cited

U.S. PATENT DOCUMENTS

| | | | |
|---|---|---|---|
| 9,417,704 B1 * | 8/2016 | Smus | .................... G06F 3/0346 |
| 9,569,001 B2 | 2/2017 | Mistry et al. | |

(Continued)

FOREIGN PATENT DOCUMENTS

WO 2013082806 A1 6/2013

OTHER PUBLICATIONS

International Search Report and Written Opinion for Application No. PCT/US2019/057175 dated Feb. 5, 2020.
(Continued)

*Primary Examiner* — Andrew Sasinowski
(74) *Attorney, Agent, or Firm* — Botos Churchill IP Law

(57) ABSTRACT

The technology provides for a system for determining a gesture provided by a user. In this regard, one or more processors of the system may receive image data from one or more visual sensors of the system capturing a motion of the user, and may receive motion data from one or more wearable computing devices worn by the user. The one or more processors may recognize, based on the image data, a portion of the user's body that corresponds to a gesture to perform a command. The one or more processors may also determine one or more correlations between the image data and the received motion data. Based on the recognized portion of the user's body and the one or more correlations between the image data and the received motion data, the one or more processors may detect the gesture.

23 Claims, 9 Drawing Sheets

Related U.S. Application Data continuation of application No. 16/373,901, filed on Apr. 3, 2019, now Pat. No. 10,908,695.

(51) Int. Cl.
   *G06T 7/20* (2017.01)
   *G06V 40/20* (2022.01)
(52) U.S. Cl.
   CPC ............ *G06F 3/0346* (2013.01); *G06F 3/167* (2013.01); *G06T 7/20* (2013.01); *G06V 40/28* (2022.01); *G06T 2207/30196* (2013.01)
(58) Field of Classification Search
   CPC ....... G09G 2310/08; G09G 2320/0247; G09G 2330/021
   See application file for complete search history.

(56) References Cited

U.S. PATENT DOCUMENTS

| | | | |
|---|---|---|---|
| 2014/0139454 A1 | 5/2014 | Mistry et al. | |
| 2018/0365975 A1* | 12/2018 | Xu | G08B 13/08 |
| 2019/0094981 A1* | 3/2019 | Bradski | G06F 3/017 |

OTHER PUBLICATIONS

Lalithamani, N., "Gesture Control Using Single Camera For PC," International Conference on Information Security & Privacy (ICISP2015), Dec. 11-12, 2015, Nagpur, India, Procedia Computer Science 78 (2016) pp. 146-152.

Miller, P., "Tap Strap wearable keyboard uses gestures to type on any surface," The Verge, May 12, 2016, https://www.theverge.com/circuitbreaker/2016/5/12/11666276/tap-strap-one-handed-wearable-keyboard, retrieved from the internet Dec. 26, 2018, 2 pages.

PlayStation Move. Wikipedia. Published Jun. 2, 2009. 16 pages. Retrieved from the Internet on Feb. 6, 2019: <hllps://en.wikipedia.org/wiki/PlayStation_Move>.

Scheunemann, M. et al. "Utilizing Bluetooth Low Energy to recognize proximity, touch and humans." 2016 25th IEEE International Symposium on Robot and Human Interactive Communication (RO-MAN). Published in 2016, 6 pages.

Schoonderwaldt, E. , et al., "Combining accelerometer and video camera: Reconstruction of bow velocity profiles." Published in Jan. 2006. Proceedings of the 2006 International Conference on New Interfaces for Musical Expressior (NIME06), Paris, France. pp. 200-203.

Silva, E.C.P. , et al., "Sensor Data Fusion for full Arm Tracking using Myo Armband and Leap Motion." SBC—Proceedings of SBGames 2015. XIV SBGames—Teresina—PI—Brazil, Nov. 11-13, 2015. pp. 186-191.

Yeo, Z.X.J. , et al., "Hand Recognition and Gesture Control Using a Laptop Web-camera." Published in 2016. 5 pages, Retrieved from the internet Dec. 26, 2018: <htlps://web.stanford.edu/class/cs231a/prev_projects_2016/CS231A Project_Final .pdf>.

Zhou, S. , et al., "Hand-Writing Motion Tracking with Vision-Inertial Sensor Fusion: Calibration and Error Correction."Sensors 2014, 14, pp. 15641-15657. Published on Aug. 25, 2014.

\* cited by examiner

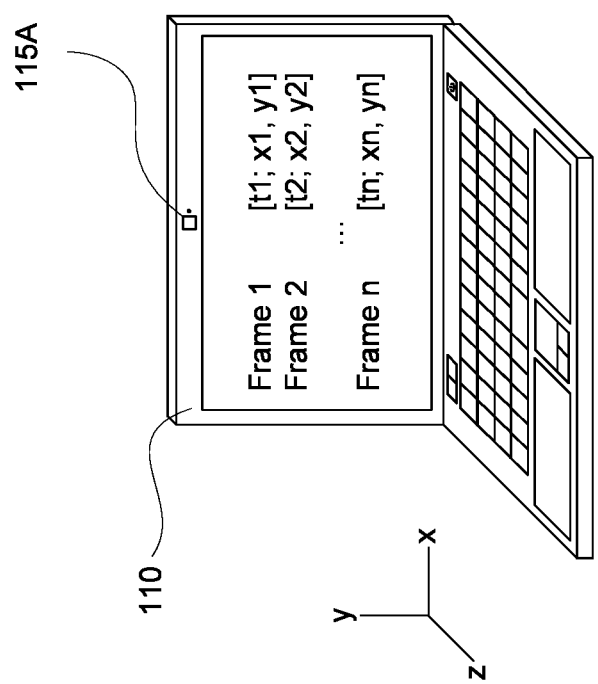
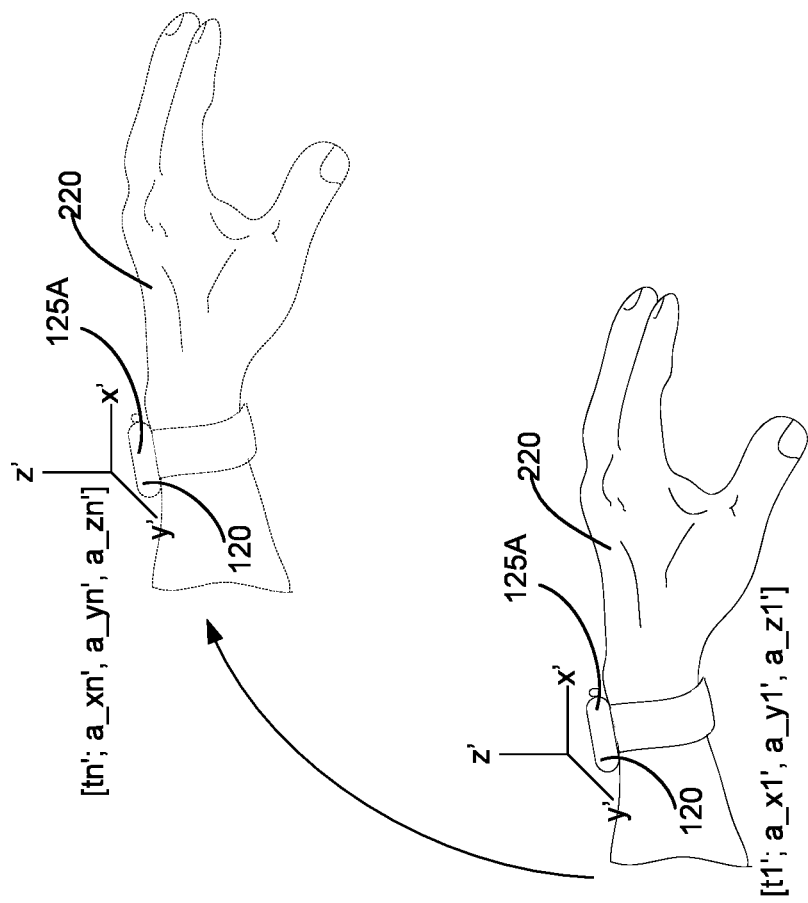
FIGURE 3

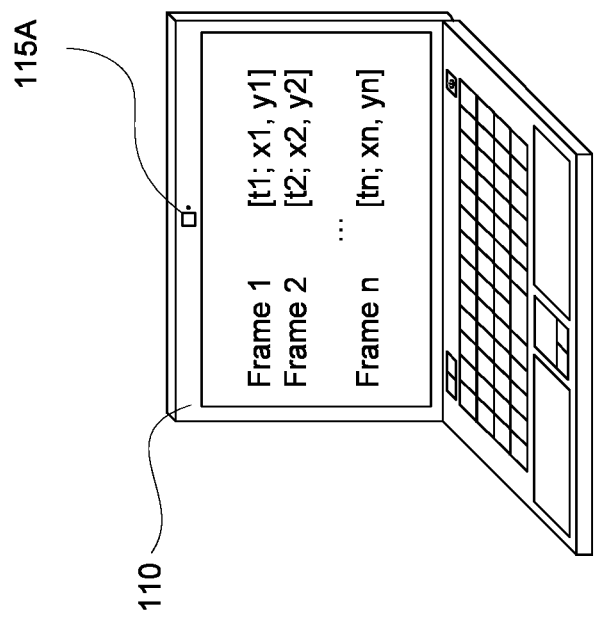
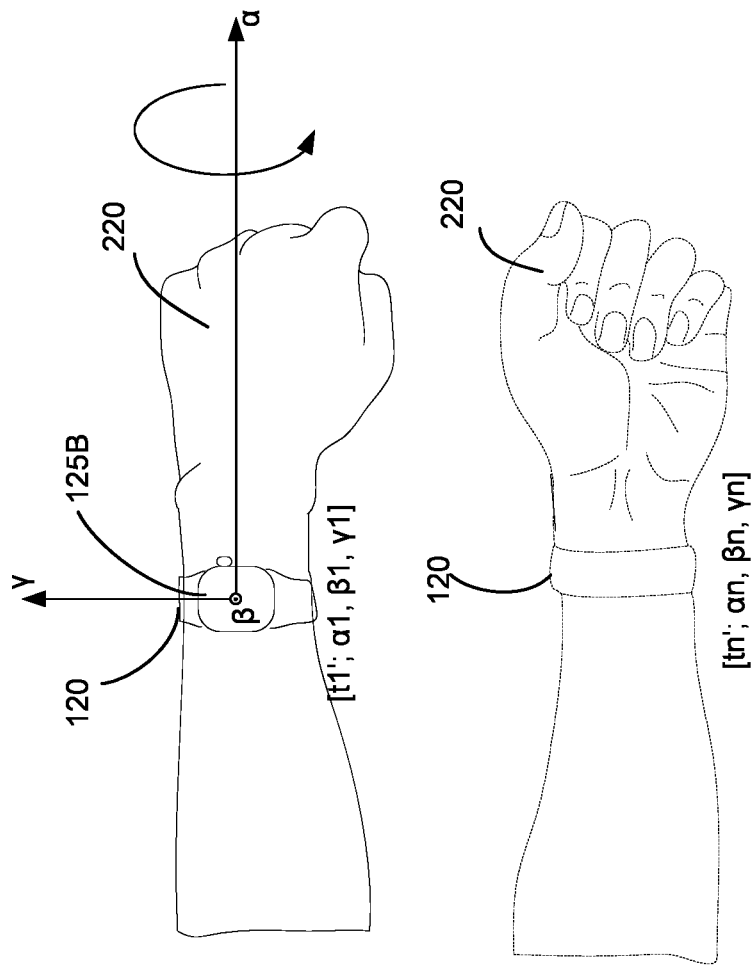
FIGURE 4

GESTURE DETECTION USING EXTERNAL SENSORS

CROSS-REFERENCE TO RELATED APPLICATIONS

This application is a continuation of U.S. application Ser. No. 17/139,241, filed Dec. 31, 2020, which application is a continuation of U.S. application Ser. No. 16/373,901 filed Apr. 3, 2019, now U.S. Pat. No. 10,908,695 issued Feb. 2, 2021, the entire disclosures of which are incorporated by reference herein.

BACKGROUND

Computing devices such as desktop and laptop computers have various user interfaces that allow users to interact with the computing devices. For example, such interfaces may include a keyboard, a mouse, a touchpad, a touch screen, buttons, etc. A user may control various functions of the computing devices and user applications installed on the computing devices through these interfaces. However, interactions with these interfaces can be inconvenient or unnatural, such as manipulating a three-dimensional object on the screen by typing on a keyboard or clicking on a mouse.

For wearable devices such as a smartwatch and head mounts, interfaces such as keyboard and mouse may be impractical or impossible due to the form factors of the wearable devices. For example, a virtual keyboard on a smartwatch may be too small for some users to reliably operate. As such, wearable devices may be designed to enable user interactions that are more convenient and natural when using such devices, such as by voice, touch, or gesture. To do so, wearable devices are equipped with various sensors, such as microphones and inertial measurement units (IMU), and users may use those sensors for the purpose of interacting with the device. Examples of IMUs may typically include an accelerometer and a gyroscope.

BRIEF SUMMARY

The present disclosure provides for receiving, by one or more processors, image data from one or more visual sensors capturing a motion of a user; receiving, by the one or more processors, motion data from one or more wearable computing devices worn by the user; recognizing, by the one or more processors based on the image data, a portion of the user's body that corresponds with a gesture to perform a command; determining, by the one or more processors, one or more correlations between the image data and the received motion data; and detecting, by the one or more processors, the gesture based on the recognized portion of the user's body and the one or more correlations between the image data and the received motion data.

Determining the one or more correlations may further include synchronizing timestamps associated with the image data and timestamps associated with the received motion data.

The method may further comprise: determining, by the one or more processors, a first coordinate system from a perspective of the one or more visual sensors; determining, by the one or more processors, a second coordinate system from a perspective of the one or more wearable computing devices; determining, by the one or more processors, one or more transformations between the first coordinate system and the second coordinate system, wherein determining the one or more correlations further includes determining the one or more transformations.

The method may further comprise determining, by the one or more processors, where the recognized portion of the user's body includes a hand of the user, a position for one or more fingers of the user's hand, wherein detecting the gesture is further based on the position of the one or more fingers.

The method may further comprise generating, by the one or more processors, a time-based series of motion data for the recognized portion of the user's body based on the image data, the generated time-based series of motion data including at least one of a time-based series of positions, a time-based series of velocities, and a time-based series of accelerations. The received motion data may include a time-based series of inertial measurements, and wherein determining the one or more correlations may include matching the time-based series of motion data generated based on the image data to the time-based series of inertial measurements.

The method may further comprise determining, by the one or more processors, depth information for the motion of the user based on the received motion data, wherein detecting the gesture is further based on the depth information.

The method may further comprise determining, by the one or more processors, orientation of the one or more wearable computing devices based on the received motion data, wherein detecting the gesture is further based on the orientation of the one or more wearable computing devices.

The method may further comprise interpolating, by the one or more processors, intermediate movements of the user between two consecutive frames of the image data based on the received motion data, wherein detecting the gesture is further based on the intermediate movements.

The method may further comprise receiving, by the one or more processors, a pairing request from the one or more wearable computing devices; requesting, by the one or more processors, authentication to pair with the one or more wearable computing devices for receiving data over a communication link; receiving, by the one or more processors, authentication to pair with the one or more wearable computing devices for receiving data over a communication link.

The method may further comprise requesting, by the one or more processors, permission to use data from the one or more wearable computing devices for gesture detection; receiving, by the one or more processors, permission to use data from the one or more wearable computing devices for gesture detection.

The method may further comprise receiving, by the one or more processors, signal strength measurements for a connection to the one or more wearable computing devices; determining, by the one or more processors, one or more correlations between the image data and the signal strength measurements, wherein detecting the gesture is further based on the one or more correlations between the image data and the signal strength measurements. The method may further comprise determining, by the one or more processors, a distance between the one or more wearable computing devices and the one or more visual sensors based on the signal strength measurements, wherein detecting the gesture is further based on the distance between the one or more wearable computing devices and the one or more visual sensors.

The method may further comprise receiving, by the one or more processors, audio data from one or more audio sensors; receiving, by the one or more processors, audio data from the one or more wearable computing devices; determining, by the one or more processors, one or more correlations between the image data and the audio data from the one or more wearable computing devices; comparing, by the one or more processors, audio data received from the one or more wearable computing devices to the audio data received from the one or more audio sensors, wherein detecting the gesture is further based on the comparison.

The method may further comprise receiving, by the one or more processors, radar measurements from a radar sensor; determining, by the one or more processors, one or more correlations between the image data and the radar measurements, wherein detecting the gesture is further based on the one or more correlations between the image data and the radar measurements.

The method may further comprise determining, by the one or more processors, relative positions of the one or more wearable computing devices, wherein the one or more wearable computing devices includes a plurality of wearable computing devices, and wherein detecting the gesture is further based on the relative positions of the one or more wearable computing devices.

The present disclosure further provides for a system, comprising one or more visual sensors configured to collect image data, and one or more processors configured to: receive image data from the one or more visual sensors capturing a motion of a user; receive motion data from one or more wearable computing devices worn by the user; recognize, based on the image data, a portion of the user's body that corresponds with a gesture to perform a command; determine one or more correlations between the image data and the received motion data; and detect a gesture based on the recognized portion of the user's body and the one or more correlations between the image data and the received motion data.

The one or more visual sensors may be a front-facing camera.

The motion data may include inertial measurements from at least one of an accelerometer and a gyroscope.

The system may further comprise a communication module configured to measure a signal strength for a connection to the one or more wearable computing devices, wherein the one or more processors are further configured to: receive signal strength measurements for a connection to the one or more wearable computing devices; determine one or more correlations between the image data and the signal strength measurements, wherein detecting the gesture is further based on the one or more correlations between the image data and the signal strength measurements.

BRIEF DESCRIPTION OF THE DRAWINGS

FIG. 3 illustrates an example of detecting gestures using inertial measurements in accordance with aspects of the disclosure.

FIG. 4 illustrates another example of detecting gestures using inertial measurements in accordance with aspects of the disclosure.

DETAILED DESCRIPTION

Overview

Figure 1:
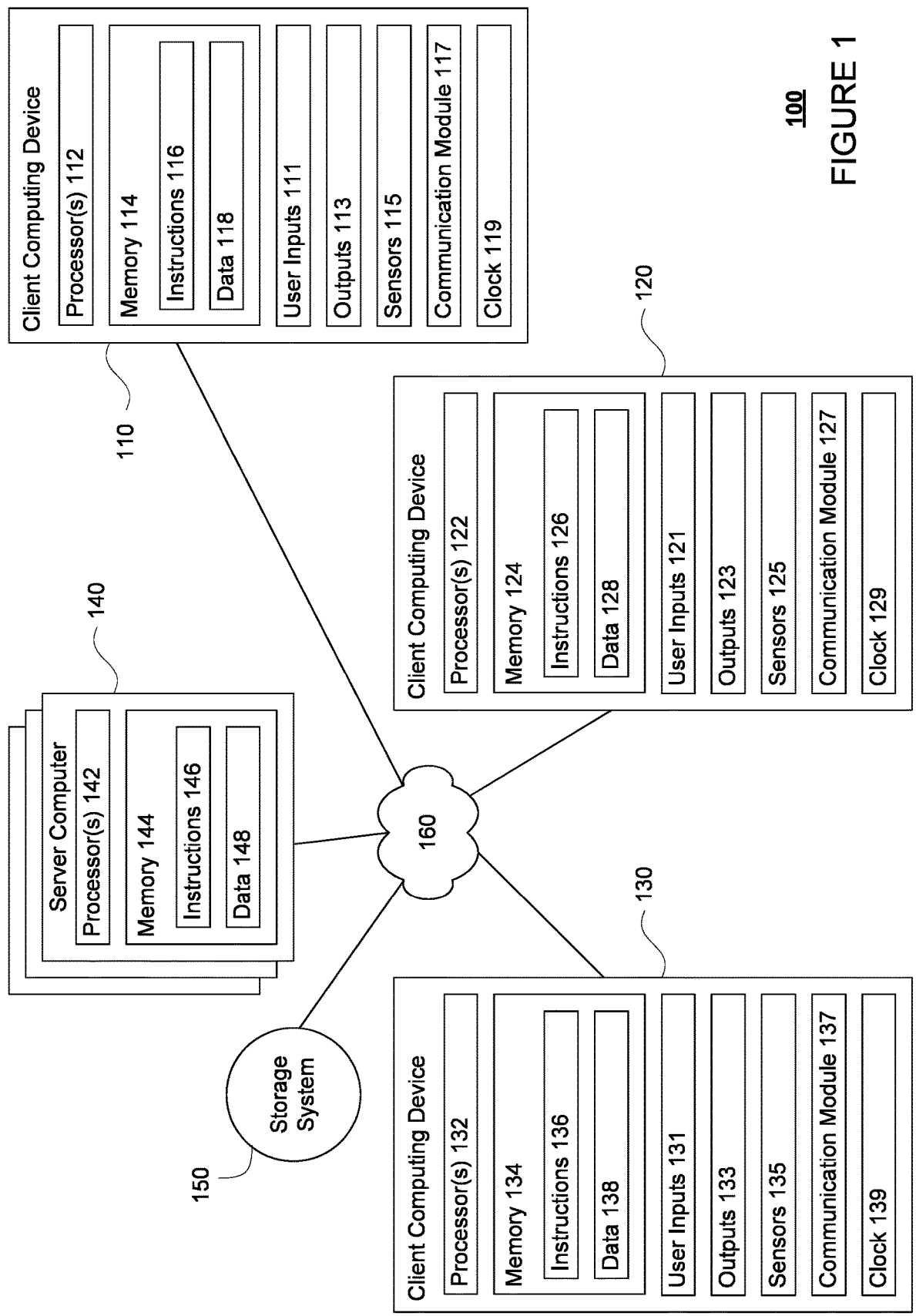
FIG. 1 is a block diagram of an example system in accordance with aspects of the disclosure.

The technology generally relates to detecting user gestures, namely, gestures provided by a user for the purpose of interacting with a computing device. Computing devices with limited sensors, such as a laptop with a single front-facing camera, may collect and analyze image data in order to detect a gesture provided by a user. For example, the gesture may be a hand swipe or rotation corresponding to a user command, such as scrolling down or rotating a display. However, such cameras may not be able to capture sufficient image data to accurately detect a gesture. For instance, all or portions of the gesture may occur too fast for a camera with a relatively slow frame rate to keep up. Further, since many cameras provide little, if any, depth information, it may be difficult for a typical laptop camera to detect complex gestures via the camera. To address these issues, a system may be configured to use data from sensors external to the system for gesture detection.

In this regard, the system may include one or more visual sensors configured to collect image data, and one or more processors configured to analyze the image data in combination with data from external sensors. As a specific example, the system may be a laptop computer, where the one or more visual sensors may be a single front-facing camera provided on the laptop computer. Examples of external sensors may include various sensors provided in one or more wearable devices worn by the user, such as a smartwatch or a head-mountable device.

The processors may receive image data from the one or more visual sensors capturing a motion of the user provided as a gesture. For example, the image data may include a series of frames taken by the front-facing camera of the laptop that capture the motion of the user's hand. For instance, the series of frames may be taken at 30 frames/s, or in a low power state at 5 frames/s, from the perspective of the front-facing camera, where each frame is associated with a timestamp provided by a clock of the laptop. The processors may generate motion data based on the image data, such as a time-based series of positions of the hand. However and as noted above, the motion data may lack sufficient precision to fully capture all of the relevant information embodied in the motion because of a slow camera frame rate or lack of depth information.

As such, the processors may also receive motion data from one or more wearable devices worn by the user. For instance, the motion data may include inertial measurements measured by an IMU of a smartwatch from the perspective of the smartwatch, and where each measurement may be associated with a timestamp provided by a clock of the smartwatch. For example, the inertial measurements may include acceleration measurements from an accelerometer in the smartwatch. For another example, the inertial measurements may include rotation or orientation measurements from a gyroscope of the smartwatch.

The processors may determine one or more correlations between the image data and motion data received from the one or more wearable devices. For example, determining correlations may include synchronizing timestamps of the image data with timestamps of the inertial measurements. In another example, determining the correlations may include transforming inertial measurements from the coordinate system of the data provided by the IMU to a coordinate system that corresponds with the image data.

Based on the correlations between the image data and the motion data received from the one or more wearable devices, the processors may detect a gesture provided by the user. For instance, since the acceleration measurements from the accelerometer may include values in a three-dimensional space, the processors may determine depth information for the user's motion. For another instance, the processors may use the rotation measurements from the gyroscope to determine whether the user's motion includes a rotation. In still another instance, since the inertial measurements may be taken at a higher frequency than the frame rate of the camera, the processors may interpolate information on intermediate movements of the user between two frames of the image data.

Additionally or alternatively, the system may be configured to use other types of data for detecting a gesture provided by the user. For instance, the processors may receive signal strength measurements for a connection to the one or more wearable devices. For example, the connection may be a Bluetooth connection, a WiFi connection, a radiofrequency connection, etc. Using the signal strength measurements, the processors may determine depth information of the user's motion.

In the instance where the user consents to the use of such data, the processors may receive audio data from the one or more wearable devices, and may also receive audio data from one or more audio sensors in the system. For example, a microphone on a smartwatch worn by the user may detect a voice command from the user as audio data, and the same voice command may also be detected by a microphone on the laptop as audio data. As such, the processors may compare the audio data detected by the wearable device to the audio data detected by the system in order to determine relative positions of the user's hand and the user's face.

The processors may also receive radar measurements from one or more radar sensors. For example, the system may include a radar sensor configured to measure positions and/or velocities of objects in the system's surrounding. As such, the processors may use the position and/or velocity measurements to determine depth information for the user's motion.

The processors may be further configured to receive and determine correlation between the sensor data from multiple wearable devices, and use the correlated sensor data for gesture detection. For example, determining the correlations may include synchronizing timestamps of the sensor data from multiple wearable devices, individually or collectively, with the image data. For another example, determining the correlations may include transforming information that is provided in the coordinate system of each wearable device to a coordinate system of the image data. For still another example, determining the correlations may include determining relative positions of each wearable device.

The technology is advantageous because it allows a system with limited sensors to more accurately determine complex and fast gestures provided by a user. By correlating inertial measurements from wearable devices to image data captured by the system, the image data may be supplemented with depth and rotation information. When the image data is captured at a lower frequency than the inertial measurements, information on intermediate movements of the user between consecutive frames of image data may be more accurately interpolated, thus increasing the accuracy of the system's interpretation of user input. Features of the technology further provide for using other types of data for detecting gesture, such as signal strength measurements, audio data, and radar measurements. Additionally, many users may find the technology relatively easy to use since the wearable device may already be paired to the system using second factor authentication. Additionally, the technology can allow visual sensors to capture image data at a reduced frame rate or a low resolution while maintaining gesture detection accuracy, thereby reducing power usage by the visual sensors.

Example Systems

Figure 2:
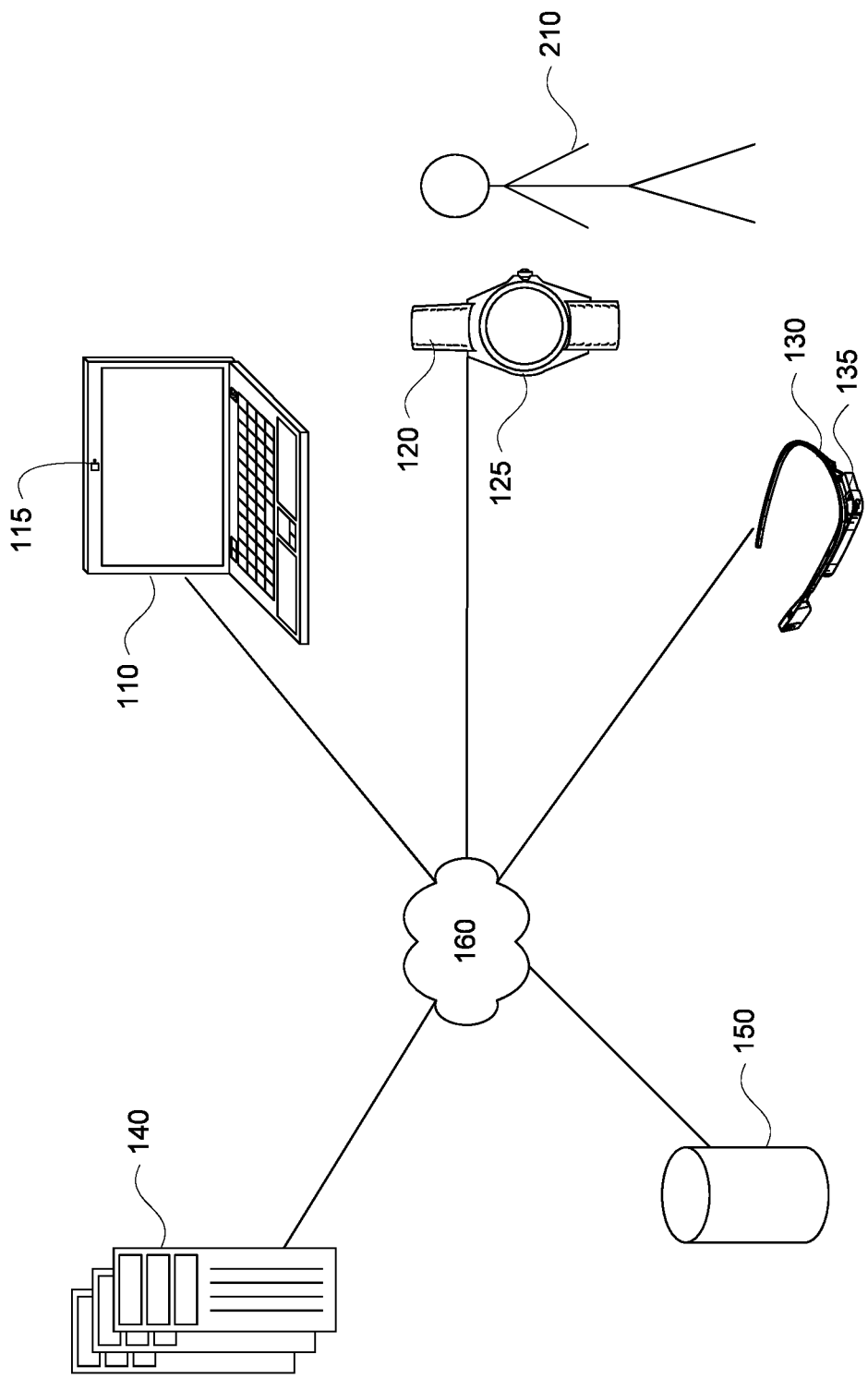
FIG. 2 is a pictorial diagram illustrating the example system in accordance with aspects of the disclosure.

FIGS. 1 and 2 illustrate an example system 100 in which the features described herein may be implemented. It should not be considered as limiting the scope of the disclosure or usefulness of the features described herein. In this example, system 100 can include computing devices 110, 120, 130, and 140 as well as storage system 150. For example as shown, computing device 110 contains one or more processors 112, memory 114 and other components typically present in general purpose computing devices.

Memory 114 can store information accessible by the one or more processors 112, including instructions 116 that can be executed by the one or more processors 112. Memory can also include data 118 that can be retrieved, manipulated or stored by the processors 112. The memory 114 can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, computing device 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include computing devices operating in a distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110, 120, 130, 140 can be at different nodes of a network 160 and capable of directly and indirectly communicating with other nodes of network 160. Although only a few computing devices are depicted in FIGS. 1 and 2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Each of the computing devices 120, 130, and 140 may be configured similarly to the computing device 110, with one or more processors, memory and instructions as described above. For instance as shown in FIGS. 1 and 2, computing devices 110, 120 and 130 may each be a client computing device intended for use by a user 210, and have all of the components normally used in connection with a personal computing device such as a central processing unit (CPU), memory (e.g., RAM and internal hard drives) storing data and instructions, input and/or output devices, sensors, communication module, clock, etc. For another instance as shown in FIGS. 1 and 2, computing device 140 may be a server computer and may have all of the components normally used in connection with a server computer, such as processors, and memory storing data and instructions.

Although the computing devices 110, 120 and 130 may each comprise a full-sized personal computing device, they may alternatively comprise mobile computing devices capable of wirelessly exchanging data with a server over a network such as the Internet. For instance, computing device 110 may be a desktop or a laptop computer as shown in FIG. 2, or a mobile phone or a device such as a wireless-enabled PDA, a tablet PC, or a netbook that is capable of obtaining information via the Internet. For another instance, computing devices 120 and 130 may each be a wearable computing device, for example as shown in FIG. 2, wearable computing device 120 may be a smartwatch, and wearable computing device 130 may be a head-mountable device. Wearable computing devices may comprise one or more mobile computing devices that are configured to be worn by/attached to a human body. Such wearable computing devices may form part of an item of clothing and/or be worn over/under clothing. Further examples of wearable computing devices include gloves and/or one or more rings.

Computing devices 110, 120, and 130 may include one or more user inputs, such as user inputs 111, 121, 131 respectively. For instance, user inputs may include mechanical actuators, soft actuators, periphery devices, sensors, and/or other components. For example, mechanical actuators may include buttons, switches, etc. Soft actuators may include touchpads and/or touchscreens. Periphery devices may include keyboards, mouse, etc. Sensors for user inputs may include microphones for detecting voice commands, visual or optical sensors for detecting gestures, as well as any of a number of sensors, including those further described below.

Computing devices 110, 120, and 130 may include one or more output devices, such as output devices 113, 123, 133 respectively. For instance, output devices may include a user display, such as a screen or a touch screen, for displaying information or graphics to the user. Output devices may include one or more speakers, transducers or other audio outputs. Output devices may include a haptic interface or other tactile feedback that provides non-visual and non-audible information to the user.

Computing devices 110, 120, and 130 may include one or more sensors, such as sensors 115, 125, 135 respectively. The type of sensors included in the computing devices may depend on the type of the computing device. For instance, for computing devices that are not wearable computing devices such as computing device 110 which is shown as a laptop computer in FIG. 2, a variety of sensors 115 may be attached to the device including a visual sensor, such as a single front-facing camera, and an audio sensor, such as a microphone. In some instances, sensors 115 may additionally include a radar sensor.

For computing devices that are wearable computing devices, such as wearable computing device 120 shown as a smartwatch and wearable computing device 130 shown as a head-mountable device in FIG. 2, sensors 125 and/or 135 may similarly include a visual sensor and an audio sensor, but may also include additional sensors for measuring gesture provided by the user. For example, sensors 125 and/or 135 may additionally include an IMU, a radar sensor, etc. According to some examples, the IMU may include an accelerometer (such as a 3-axis accelerometer) and a gyroscope (such as a 3-axis gyroscope). The sensors 125 and/or 135 for wearable computing devices may further include a barometer, a vibration sensor, a heat sensor, a radio frequency (RF) sensor, a magnetometer, and a barometric pressure sensor. Additional or different sensors may also be employed.

In order to obtain information from and send information to remote devices, including to each other, computing devices 110, 120, 130 may each include a communication module, such as communication modules 117, 127, 137 respectively. The communication modules may enable wireless network connections, wireless ad hoc connections, and/or wired connections. Via the communication module, the computing devices may establish communication links, such as wireless links. For instance, the communication modules 117, 127, and/or 137 may include one or more antennas, transceivers, and other components for operating at radiofrequencies. The communication modules 117, 127, and/or 137 may be configured to support communication via cellular, LTE, 4G, WiFi, GPS, and other networked architectures. The communication modules 117, 127, and/or 137 may be configured to support Bluetooth®, Bluetooth LE, near field communications, and non-networked wireless arrangements. The communication modules 117, 127, and/or 137 may support wired connections such as a USB, micro USB, USB type C or other connector, for example to receive data and/or power from a laptop, tablet, smartphone or other device.

Using their respective communication modules, one or more of the computing devices 110, 120, 130 may be paired with one another for transmitting and/or receiving data from one another. For example, wearable computing devices 120 and/or 130 may come within a predetermined distance of computing device 110, and may become discoverable by computing device 110 via Bluetooth®. As such, computing device 110, or wearable computing device 120 and/or 130, may initiate pairing. Before pairing, user authentication may be requested by the computing device 110, or wearable computing device 120 and/or 130. In some instances, two-way authentication may be required for pairing, where the user must authenticate the pairing on both devices to be paired, such as on both computing devices 110 and 120, or both computing devices 110 and 130, etc.

The communication modules 117, 127, 137 may be configured to measure signal strengths for wireless connections. For example, communication modules 117, 127, 137 may be configured to measure received signal strength (RSS) of a Bluetooth® connection. In some instances, communication modules 117, 127, 137 may be configured to report the measured RSS to each other.

The computing devices 110, 120, 130 may each include one or more internal clocks, such as clocks 119, 129, 139 respectively. The internal clocks may provide timing information, which can be used for time measurement for apps and other programs run by the computing devices, and basic operations by the computing devices, sensors, inputs/outputs, GPS, communication system, etc.

As with memory 114, storage system 150 can be of any type of computerized storage capable of storing information accessible by one or more of the computing devices 110, 120, 130, 140, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

For instance, processors 112 of computing device 110 may receive an input from user 210 requesting to interact with computing device 110 using gestures. As such, processors 112 may control sensors 115 of computing device 110 to collect sensor data on motion of the user provided as a gesture, and may also control communication module 117 to collect additional sensor data from external sensors, such as from one or more wearable computing devices worn by the user 210. Once the sensor data from sensors 115 and the sensor data from the external sensors are received by processors 112, processors 112 may analyze the sensor data in order to detect a gesture provided by the user.

FIG. 3 illustrates an example situation of detecting a gesture using motion data received from external sensors in accordance with aspects of the disclosure. Motion data includes information associated with the motion of a person's body (including parts thereof, such as a hand) through space. For example, motion data for a motion may include one or more vectors associated with the motion's angle and speed, which may include a series of 3D coordinates associated with the position of a person's body, or a portion of their body at different times. For example, the system may detect and analyze the speed and angle of motion of a person's thumb separately from the speed and angle of their pointer finger on the same hand. Referring to FIG. 3, an example gesture provided by the user 210 is shown where a hand 220 of the user 210 is moving upwards and towards (indicated by arrow) the computing device 110. This motion may be captured by image data collected by one or more visual sensors of computing device 110, such as camera 115A, which is shown in FIG. 3 as a single front-facing camera. For ease of reference, the aperture of camera 115A may be considered to be in a plane defined by x- and y-axes, where the z-axis is normal to the plane of the aperture. As such, the motion of the hand 220 may be captured by a series of images or frames taken by camera 115A. For instance, camera 115A may be configured to take images at a frame rate of 30 frames/s. For another instance, camera 115A may be configured to take images at lower frame rates in a low power state, such as a5 frames/s. The series of frames may each be associated with a timestamp, for example the timestamps may be provided by clock 119 of computing device 110.

Processors 112 may receive the image data, and analyze the image data to detect a gesture provided by the user. For instance, processors 112 may arrange the frames of the image data chronologically according to their respective timestamps. Processors 112 may use image or video segmentation, or other image processing methods, to separate portions of each image that correspond to the hand 220 of the user 210 from portions that correspond to other objects or background. In this regard, processors 112 may use pattern or object recognition models, such as machine learning models, to recognize one or more portions of the user's body that corresponds to a gesture to perform a command. For instance, processors 112 may recognize in each frame of the image data one or more portions that corresponds to a hand 220 of the user 210. For another instance, processors 112 may recognize one or more portions of the image data that appear to be moving between frames.

Processors 112 may generate a time-based series of motion data for the recognized portion of the user's body corresponding to a gesture. For example, the time-based series of motion data may include a time-based series of positions for the hand 220, shown as [t1; x1, y1], [t2; x2, y2], ..., [tn; xn, yn]. The positions may correspond to a single point of the hand 220 as shown, or may correspond to multiple points of the hand 220, such as an outline of the hand 220. Other examples of motion data may include velocities and accelerations for the hand 220. For example, processors 112 may generate a time-based series of velocities for the hand 220 based on the time-based series of positions for the hand 220. For another example, processors 112 may generate a time-based series of accelerations for the hand 220 based on the time-based series of positions for the hand 220. In other instances, processors 112 may further process the image data to determine additional details, such as positions of the fingers of the hand 220, rotation of the hand 220, etc. Based on the time-based series of motion data for the hand 220, processors 112 may detect a gesture provided by the user, such as the upwards motion shown in FIG. 3.

As mentioned above the image data may include two-dimensional images without depth information, especially if the camera is a single front-facing camera. In the example shown in FIG. 3, positions for the hand 220 include only values with respect to two coordinates (shown as x and y) in the plane of the aperture of the camera 115A, but do not include values with respect to the third coordinate (shown as z), which corresponds to a direction normal to the aperture of the camera 115A. As such, processors 112 may not be able to determine whether the hand 220 is moving towards or away from the camera 115A, which may result in detecting an incorrect gesture and, a as result, incorrectly determining the user's command. For instance, where a gesture of a hand moving directly upwards corresponds to a command to scroll down, and a gesture of a hand moving upwards and forwards corresponds to a command to move a window backwards (behind other windows), a user command to move a window backwards may be incorrectly interpreted as a command to scroll down if the command is determined based solely on the two-dimensional image data. Although processors 112 may attempt to determine changes in distance between the camera 115A and the hand 220 based on changes in a size of the hand 220 captured in each frame, such determinations may be inaccurate due to, for example, rotations of the hand 220 and/or variations in background.

Further as mentioned above, camera 115A may have a low frame rate, which may not be able to sufficiently capture a fast motion of the user. For example, in each of the frames captured by camera 115A, the hand 220 may appear to be moving upwards in the y-direction, however, there may be movement downwards between two frames that may not be captured by camera 115A. Further, there may also be movement in the x-direction between two frames, which may not be captured by camera 115A.

As such, processors 112 may use sensor data from one or more external sensors in addition to the image data collected by camera 115A to detect gestures provided by a user to computing device 110. For example as shown in FIG. 3, the one or more external sensors may be one or more sensors in the wearable computing device 120 worn by the user 210. For instance, the one or more sensors may be an accelerometer 125A in an IMU of a smartwatch, such as a three-axis accelerometer that can measure accelerations in a three-dimensional space.

In this regard, the computing device 110 may establish a communication link with the wearable computing device 120 in order to receive sensor data from the wearable computing device 120. For example, the communication link may be a wireless network communication link, such as a WiFi or radiofrequency link, or a non-network wireless communication link, such as a Bluetooth® link. In some instances, the wearable computing device 120 may initiate pairing and, in other instances, the computing device 110 may initiate pairing or pairing may be initiated by a user input. For example, the computing device 110 may receive a pairing request from the wearable computing device 120.

As mentioned above, authentication may be required for pairing computing device 110 with wearable computing devices. For example, the wearable computing device 120 may become discoverable by computing device 110 via Bluetooth® when the wearable computing device 120 comes within a predetermined distance of computing device 110. As such, computing device 110 or wearable computing device 120 may request user authentication for pairing, which may include entering a username and password, a verification code, etc. In some instances, two-way authentication may be required for pairing, where the user must provide authentication on computing device 110 to pair with wearable computing device 120, and also provide authentication on wearable computing device 120 to pair with computing device 110.

In the instance where the user consents to the use of such data, sensor data provided by the wearable computing device may be used to interpret the user's gestures to the paired computing device. For example, computing device 110 may display a prompt asking the user whether sensor data from the wearable computing device 120 may be used for gesture detection. In some instances, computing device 110 may allow the user to select the types of data that the user grants permission for use in gesture detection by computing device 110. Alternatively or additionally, wearable computing device 120 may display a prompt asking the user whether wearable computing device 120 may share one or more types of its sensor data with computing device 110. Yet further, the user may have configured authorization settings in the wearable computing device 120 beforehand to permit detection by and/or data sharing with the computing device 110.

Processors 112 may thereafter receive sensor data from the wearable computing device 120 via the communication link. The received sensor data may include motion data detected by one or more sensors of the wearable computing device 120, such as inertial measurements. In the example shown, the sensor data includes inertial measurements from accelerometer 125A. For instance, accelerometer 125A may measure accelerations of the wearable computing device 120 with respect to three axes in a three-dimensional space. For example and as shown in FIG. 3, two axes x' and y' may correspond to two directions in a plane of a surface of the wearable computing device 120 (e.g., face of smartwatch), and one axis z' may correspond to a direction normal to the surface of the wearable computing device 120. In other examples, the axis x', y', and z' may be some other axes sufficient to define a three-dimensional space. Each acceleration measurement may be associated with a timestamp, for example the timestamps may be provided by clock 129 of wearable computing device 120.

As such, processors 112 may receive a time-based series of acceleration measurements from the wearable computing device 120, shown as [t1'; a_x1', a_y1', a_z1'], . . . , [tn'; a_xn', a_yn', a_zn']. For instance, t1' may be the timestamp at or near the beginning of the motion, and tn' may be the timestamp at or near the end of the motion. For example as shown, a_x1' may be the value for acceleration along x'-axis in the plane of the face of the smartwatch, a_y1' may be the value for acceleration along y'-axis also in the plane of the face of the smartwatch, and a_z1' may be the value for acceleration along z'-axis normal to the face of the smartwatch. In some instances, processors 112 may generate additional motion data based on the received acceleration measurements from the accelerometer 125A. As examples, a time-based series of velocities may be generated based on the time-based series of acceleration measurements, a time-based series of positions may be generated based on the time-based series of acceleration measurements, etc. In other instances, such additional motion data may be generated based on the acceleration measurements by processors 122 of the wearable computing device 120, and received by processors 112 of computing device 110.

In order to use both the image data and the motion data received from the wearable computing device 120 to detect gestures, processors 112 may determine one or more correlations between the image data and the received motion data. For instance, processors 112 may determine one or more correlations between the image data from camera 115A and the inertial measurements from the wearable computing device 120. For instance, timestamps for the image data may be provided by clock 119 of computing device 110, and timestamps for the received inertial measurements may be provided by clock 129 of wearable computing device 120. In that regard, determining the one or more correlations may include matching each received inertial measurement with a frame of image data having a timestamp closest in time.

In instances where a duration of the motion captured by image data is different from a duration of the motion captured by the received inertial measurements, and/or where the image data is taken at different rates than the inertial measurements, matching by timestamps closest in time may result in inaccuracies. In that regard, determining the one or more correlations may include determining a delay between the timestamps for the image data and the timestamps for the received inertial measurements. For example, when a connection is made between the computing device 110 and the wearable computing device 120, processors 112 may be provided with a timestamp for the connection from its clock 119. Processors 112 may also receive a timestamp for the connection from clock 129 (through computing device 120). Also at the time of connection, a server computer, such as computing device 140 shown in FIGS. 1 and 2, may be configured to send a first timestamp to computing device 110, and a second timestamp to computing device 120. Based on a comparison of the timestamp from clock 119, the timestamp from clock 129, and the first timestamp from the server, latency between the clocks 119 and 129 may be determined. Thereafter, re-synchronization may be performed at a later time to prevent inaccuracies due to drift. For example, the re-synchronization may be performed periodically at a predetermined interval, or based on need, such as accuracy of gesture detection.

Once the delay between clock 119 and clock 129 is determined, processors 112 may use the respective timestamps to match the received inertial measurements to the corresponding motion data generated based on the image data. For example, processors 112 may match [t1'; a_x1', a_y1', a_z1] with [t1; x1, y1], [tn'; a_xn', a_yn', a_zn'] with [tn; xn, yn], etc. In some instance, inertial measurements may be taken by the wearable computing device 120 at a higher frequency than the frame rate of camera 115A of computing device 110. In such cases, there may be additional inertial measurements between two frames of image data.

Further as shown in FIG. 3, whereas the coordinate system of the computing device 110 may be based on the camera 115A (x, y, z), the coordinate system of the accelerometer 125A may be based on the wearable computing device 120 (x', y', z'). As such, determining the one or more correlations may include determining a transformation between a coordinate system of the image data and a coordinate system of the inertial measurements. Further as shown, whereas the coordinate system for the camera 115A may be stationary, the coordinate system for the wearable computing device 120 (x', y', z') may move along with the hand 220. As such, a transformation may be determined between each frame of the image data and the corresponding received inertial measurements. For example, the transformation correlating [t1'; a_x1', a_y1', a_z1] with [t1; x1, y1] may be different from the transformation correlating [tn'; a_xn', a_yn', a_zn'] with [tn; xn, yn].

In this regard, processors 112 may compare motion data generated based on the image data with corresponding motion data received from wearable computing device 120 for each frame of the series of frames. For instance, processors 112 may generate acceleration data for t1 based on image data, [a_x1, a_y1], and may compare these values to the received acceleration measurement at t1' [a_x1', a_y1', a_z1']. By comparing these values, processors 112 may determine a transformation between the two coordinate systems. For instance, processors 112 may determine that a_x1=a_x1', and a_y1=a_z1', and as such, x-axis is parallel to x'-axis, y-axis is parallel to z'-axis, and z-axis is parallel to y'-axis. Additionally or alternatively, processors 112 may use an object recognition model to detect the wearable computing device 120 in each frame of the image data, and use image processing methods to determine an orientation of the wearable computing device 120 in each frame of the image data. Processors 112 may then compare the positions and orientations of the computing device 120 based on the image data with the acceleration measurements received from the computing device 120 to determine the relationships between the two coordinate systems. In still other instances, since rotation measurements described with respect to FIG. 4 below may provide an orientation of the wearable computing device 120, the rotation measurements may be used for determining the one or more transformations.

Once the transformations are determined, processors 112 may transform the motion data received from wearable computing device 120 into values with respect to the coordinate system of the computing device 110. For instance, processors 112 may transform the inertial measurements from accelerometer 115A into values with respect to the coordinate system of the computing device 110. Since there may be more inertial measurements than frames of image data for the same duration, the additional inertial measurements between two frames may be transformed based on the transformation for one of the two frames, or some average of transformations for the two frames.

Processors 112 may then combine the received motion data from the wearable computing device 120 with the motion data generated based on the image data in any of a number of ways. For instance, the combined motion data for each frame may include a position with additional depth information. For example, frame 1 may have combined motion data such as [t1; (x1, y1), a_z1], where a_z1 is determined based on acceleration measurement from computing device 120 and the transformation described above. For another instance, the combined motion data for each frame may include a velocity values in three-dimensional space. For example, frame 1 may have combined motion data such as [t1; v_x1, v_y1, v_z1], where v_x1 and v_y2 are generated based on image data, and v_z1 is determined based on acceleration measurement from computing device 120 and the transformation described above. Further, where there may be more inertial measurements than frames of image data, the additional inertial measurements may be used for determining motion between two frames. For example, although there may not be a frame between the two consecutive frames at t1 and t2, information on intermediate movements of the hand 220 between t1 and t2 may be interpolated based on the additional inertial measurements and the transformations described above. For still another instance, the combined motion data for each frame may include some average or weighted average of motion data generated based on image data and the received inertial measurements. For yet another instance, where the motion data generated based on image data includes additional details based on image analyses, such as positions of the fingers of the hand 220 or rotation of the hand 220, the combined motion data may include such additional details.

Based on the recognized portion of the user's body corresponding to a gesture to perform a command and the combined motion data, processors 112 may detect the gesture provided by the user. For example, having recognized the portion of the user's body corresponding to the gesture is the hand 220 of the user, and using the combined motion data that include depth information, processors 112 can distinguish a gesture where the hand 220 is moving directly upwards from a gesture where the hand 220 is moving upwards and towards computing device 110 as shown in FIG. 3, which may correspond to different user commands as described above. For another example, where the combined motion data further includes additional details such as positions of the fingers of the hand 220, processors 112 may be able to distinguish the gesture shown in FIG. 3 where the hand 220 is open while moving in the trajectory shown, from another gesture where the hand 220 is closed while moving in the trajectory shown. For example, while the gesture shown in FIG. 3 with open hand 220 may correspond to a user command to move a displayed window backwards, a gesture with closed hand 220 moving in the same trajectory as shown in FIG. 3 may correspond to a user command to increase a volume of a speaker of computing device 110.

Once a gesture provided by the user 210 is detected, processors 112 may determine whether the gesture corresponds to a user command, such as a user command stored in memory 114 of computing device 110. If so, processors 112 may control one or more functions of the computing device 110 based on the user command. For example, the gesture shown in FIG. 3 may correspond to a user command to move a window currently displayed by the computing device 110 backwards. As such, processors 112 may control computing device 110 to change the display accordingly.

FIG. 4 illustrates another example of detecting a gesture using motion data received from external sensors in accordance with aspects of the disclosure. As shown, the example motion of the hand 220 includes a rotation of the hand 220, which may be captured by camera 115A of computing device 110. However, in some instances such as for a slight tilt, processors 112 may not be able to detect the rotation of the hand 220 simply by processing the image data using image processing methods. Further as mentioned above, the rotation may be too fast to be captured by camera 115A. As such, processors 112 may additionally use rotation measurements from a gyroscope 125B of wearable computing device 120 for gesture detection. The received rotation measurements may include rotation angle and/or angular velocity measurements with respect to three rotational axes. As such, the received rotation measurements may include roll, pitch, and yaw angle measurements of the wearable computing device 120. In other words, the received rotation measurements provide an orientation of the wearable computing device 120 with respect to its three rotation axes. Each rotation measurement may be associated with a timestamp, for example the timestamps may be provided by clock 129 of computing device 120. As such, the received rotation measurements may be a time-based series of rotation measurements.

In order to use both the image data and the received rotation measurements to detect gestures, processors 112 may determine one or more correlations between the image data from camera 115A and the rotation measurements from the wearable computing device 120. For instance, the timestamps for the rotation measurements may be synchronized with the timestamps for the image data as described above with respect to FIG. 3. For another instance, transformations may be determined between the coordinate system of the computing device 110 and the wearable computing device 120 as described above with respect to FIG. 3. However, since rotations from the perspective of the hand 220 may be harder to detect using camera 115A than rotations from the perspective of the camera 115A, in other instances processors 112 may not transform the rotation measurements.

Processors 112 may combine the received rotation measurements with the motion data generated based on image data in any of a number of ways. For instance, the combined motion data for each frame may include a position with additional rotation information. For example, frame 1 may have combined motion data such as [t1; (x1, y1), ($\alpha$1, $\beta$1, $\gamma$1)], where $\alpha$1 is roll angle, $\beta$1 is yaw angle, and $\gamma$1 is pitch angle. Further, where there may be more rotation measurements than frames of image data, the additional rotation measurements may be used for determining rotation of the hand 220 between two frames. For example, although there may not be a frame between t1 and t2, information on intermediate rotation of the hand 220 between t1 and t2 may be interpolated based on the additional rotation measurements taken between t1 and t2. For another instance, the combined motion data for each frame may include some average or weighted average of rotation data generated based on image data and the received rotation measurements.

Based on the recognized portion of the user's body corresponding to a gesture to perform a command and the combined motion data, processors 112 may detect the gesture provided by the user. For example, using the combined motion data that include rotation information, processors 112 can detect a gesture where the hand 220 is not moving relative to the camera 115A, but is rotating about an axis. Once a gesture provided by the user 210 is detected, processors 112 may determine whether the gesture corresponds to a user command, such as a user command stored in memory 114 of computing device 110. If so, processors 112 may control one or more functions of the computing device 110 based on the user command. For example, the rotation gesture shown in FIG. 4 may indicate that the user wants to rotate an image currently displayed by the computing device 110. As such, processors 112 may control computing device 110 to change the display accordingly.

Figure 5:
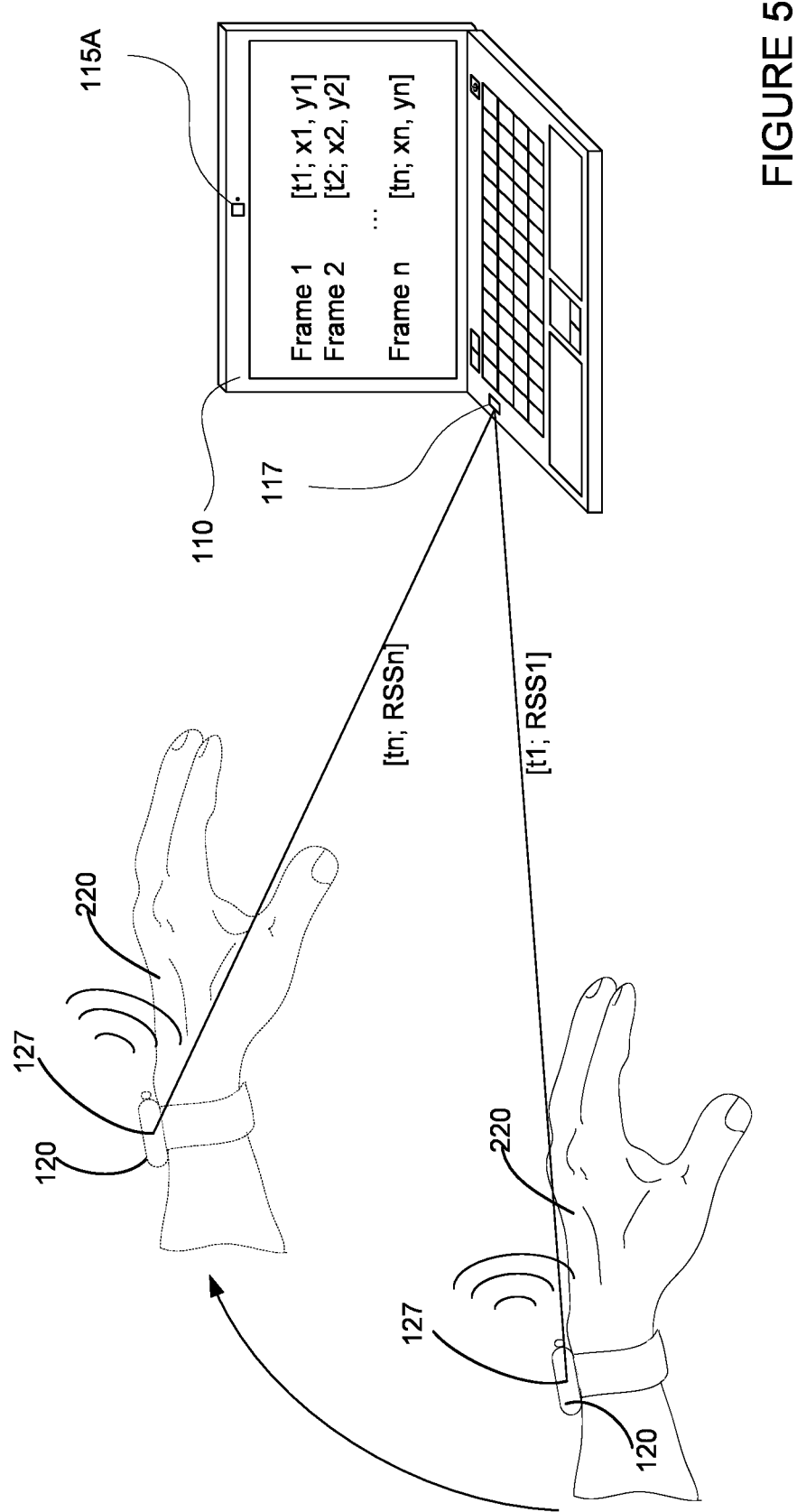
FIG. 5 illustrates an example of detecting gestures using signal strength measurements in accordance with aspects of the disclosure.

In the instance where the user consents to the use of such data, FIG. 5 illustrates an example situation of detecting a gesture using signal strength measurements in accordance with aspects of the disclosure. FIG. 5 shows the same example motion of the hand 220 in front of computing device 110 as in FIG. 3. As an alternative or in addition to using motion data, computing device 110 may use signal strength measurements to determine depth information for the motion. Using signal strength measurements in addition to the motion data and image data may increase the accuracy of identifying the gesture. For example, signal strength measurements are likely already being used by computing device 110 and/or wearable computing device 120 for establishing and/or maintaining connections. For another example, signal strength measurements may not require sharing data between the two devices, which may improve efficiency of gesture detection.

As described with respect to example systems above, communication module 117 of computing device 110 may measure signal strengths of the communication link between computing device 110 and wearable computing device 120 while the motion of the hand 220 is captured by camera 115A. For example, the signal strength may be RSS measurements for Bluetooth® connection. Each signal strength measurement may be associated with a timestamp, for example the timestamps may be provided by clock 119 of computing device 110. As such, processors 112 may receive from communication module 117 a time-based series of signal strength measurements, shown as [t1; RSS1], . . . , [tn; RSSn].

Since the timestamps for the signal strength measurements and the image data are both provided by clock 119, there may not be a need to synchronize the timestamps. However, alternatively or additionally, the signal strength may be measured by communication module 127 of the wearable computing device 120, and sent to the processors 112. In such instances, the timestamps for the signal strength measurements may be provided by clock 129, and therefore may need to be synchronized with the timestamps for image data as described above with respect to FIG. 3.

Based on the time-based series of signal strength measurements, processors 112 may determine distances between the computing device 110 and the wearable computing device 120. For instance, for many communication systems such as Bluetooth®, signal strength may drop with increasing distance between two devices. For example, the signal strength pattern from a Bluetooth® device may be represented by a series of concentric rings, where each ring is a predetermined distance from the device, and each ring has a known signal strength value. As such, based on the value of the signal strength measurement, processors 112 may determine a distance between wearable computing device 120 and computing device 110. For example as shown in FIG. 5, processors 112 may determine that, at time t1, signal strength measurement RSS1 corresponds to a ring with distance d1 from computing device 110, and at time tn, signal strength measurement RSSn corresponds to a ring with distance do from computing device 110. Where the signal strength measurement is between two known signal strength values for two consecutive rings, a distance may be determined by taking an average or weighted average of the distances for the two consecutive rings.

Processors 112 may combine the signal strength measurements with the motion data generated based on image data in any of a number of ways. For instance, the combined motion data for each frame may include a position and a signal strength measurement, such as [t1; (x1, y1), RSS1]. For another instance, the combined motion data for each frame may include a position and a distance between the wearable computing device 120 and the computing device 110, such as [t1; (x1, y1), d1], where d1 is determined based on signal strength measurement RSS1. Further, where there may be more signal strength measurements than frames of image data, the additional distances may be used for determining distances of the hand 220 from computing device 110 between two consecutive frames. For still another instance, the combined motion data may be a position that includes a value for the z-coordinate (or depth information). For example, frame 1 may have combined motion data such as [t1; x1, y1, z1], where z1 may be determined by finding a difference between a distance determined based on the signal strength measurement and a distance determined based on x1 and y1, or in other words, based on the relationship $d1^2 = x1^2 + y1^2 + z1^2$.

As described with respect to FIG. 3, based on the recognized portion of the user's body corresponding to a gesture to perform a command and the combined motion data, processors 112 may detect the gesture provided by the user. Once a gesture provided by the user 210 is detected, processors 112 may determine whether the gesture corresponds to a user command, such as a user command stored in memory 114 of computing device 110. If so, processors 112 may control one or more functions of the computing device 110 based on the user command.

Figure 6:
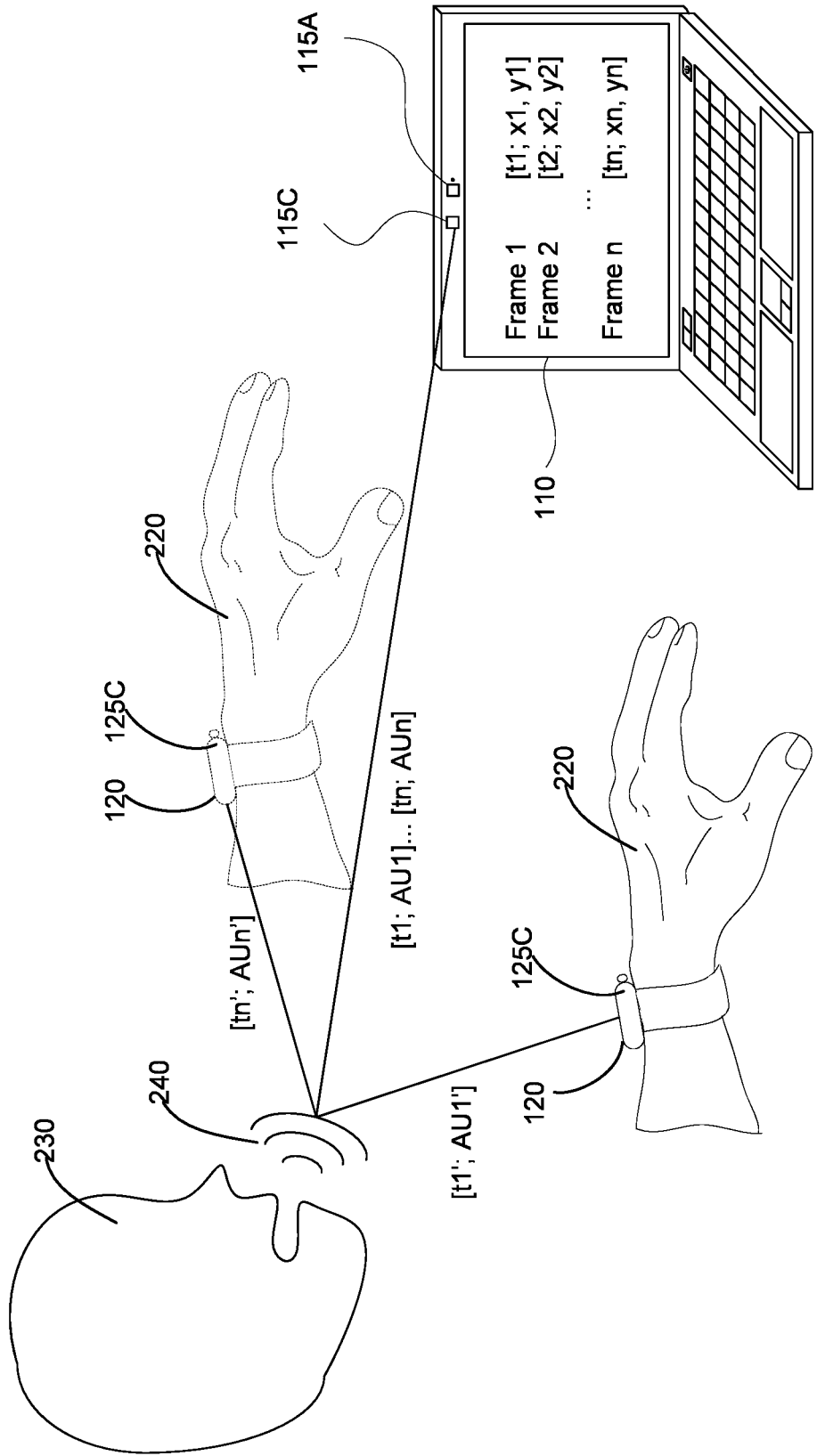
FIG. 6 illustrates an example of detecting gestures using audio data in accordance with aspects of the disclosure.

In the instance where the user consents to the use of such data, FIG. 6 illustrates an example situation of detecting a gesture using audio data in accordance with aspects of the disclosure. FIG. 6 shows the same example motion of the hand 220 in front of computing device 110 as in FIG. 3. FIG. 6 further shows that, during the motion of the hand 220, the user 210 also provided a voice command 240. As described with respect to example systems above, audio sensor 125C of the wearable computing device 120 may detect the voice command 240 as audio data. For example, the audio data may include various information about the voice command 240, such as volume, frequency, etc. The audio data may be associated with timestamps, for example provided by clock 129 of wearable computing device 120. As such, processors 112 may receive the audio data from the wearable computing device 120, such as a time-based series of the audio data shown as [t1'; AU1'], . . . , [tn'; AUn'].

Processors 112 may compare the audio data detected by the wearable computing device 120 with audio data detected by another audio sensor in order to determine relative distances between the hand 220 and the computing device 110. For instance as described with respect to example systems, an audio sensor 115C of the computing device 110 may also detect the voice command 240 from the user 210 as audio data. The audio data detected by audio sensor 115C may be associated with timestamps, such as provided by clock 119. Thus as shown in FIG. 6, audio data detected by the audio sensor 115C may also be a time-based series, shown as [t1; AU1], . . . , [tn; AUn]. The timestamps for the audio data detected by the wearable computing device 120 and the timestamps for the audio data detected by the computing device 110 may be synchronized as described above with respect to FIG. 3.

Processors 112 may compare the audio data detected by the wearable computing device 120 with the audio data detected by the audio sensor 115C in order to determine relative distances of the hand 220 to the computing device 110. For instance, if the audio data detected by audio sensor 125C of wearable computing device 120 decreases in volume between times t1 and t2, but the audio data detected by audio sensor 115C of computing device 110 remains the same between t1 and t2, processors 112 may determine that the hand 220 has moved closer to computing device 110 between t1 and t2. For another instance, if the audio data detected by audio sensor 125C of wearable computing device 120 increases in volume by 10 dB between t1 and t2, but the audio data detected by audio sensor 115C increases in volume by 5 dB between t1 and t2, processors 112 may determine that the hand 220 has moved away from the computing device 110 between t1 and t2.

In other instances, instead of from the user 210 (such as the voice command 240), audio data may come from any of a number of other sources. For example, computing device 110 may output audio data, which may be detected by computing device 120, such as by audio sensor 125C. Processors 112 may compare one or more characteristics of the audio data outputted by computing device 110 with one or more characteristics of the audio data detected by computing device 120. Further in this regard, although the audio data shown in this example is a voice command 240 within human hearing range, alternatively or additionally audio data outside of human hearing range may be used.

Processors 112 may combine the relative distances determined based on the audio data with the motion data generated based on image data in any of a number of ways. For instance, the combined motion data for each frame may include a position and a movement direction, such as [t1; (x1, y1), moving towards computing device 110]. For another instance, the combined motion data for each frame may include rotational measurements and movement direction, such as [t1; ($\alpha$1, $\beta$1, $\gamma$1), microphone of computing device 110 is moving away from voice].

As described with respect to FIG. 3, based on the recognized portion of the user's body corresponding to a gesture to perform a command and the combined motion data, processors 112 may detect the gesture provided by the user. Once a gesture provided by the user 210 is detected, processors 112 may determine whether the gesture corresponds to a user command, such as a user command stored in memory 114 of computing device 110. If so, processors 112 may control one or more functions of the computing device 110 based on the user command.

Figure 7:
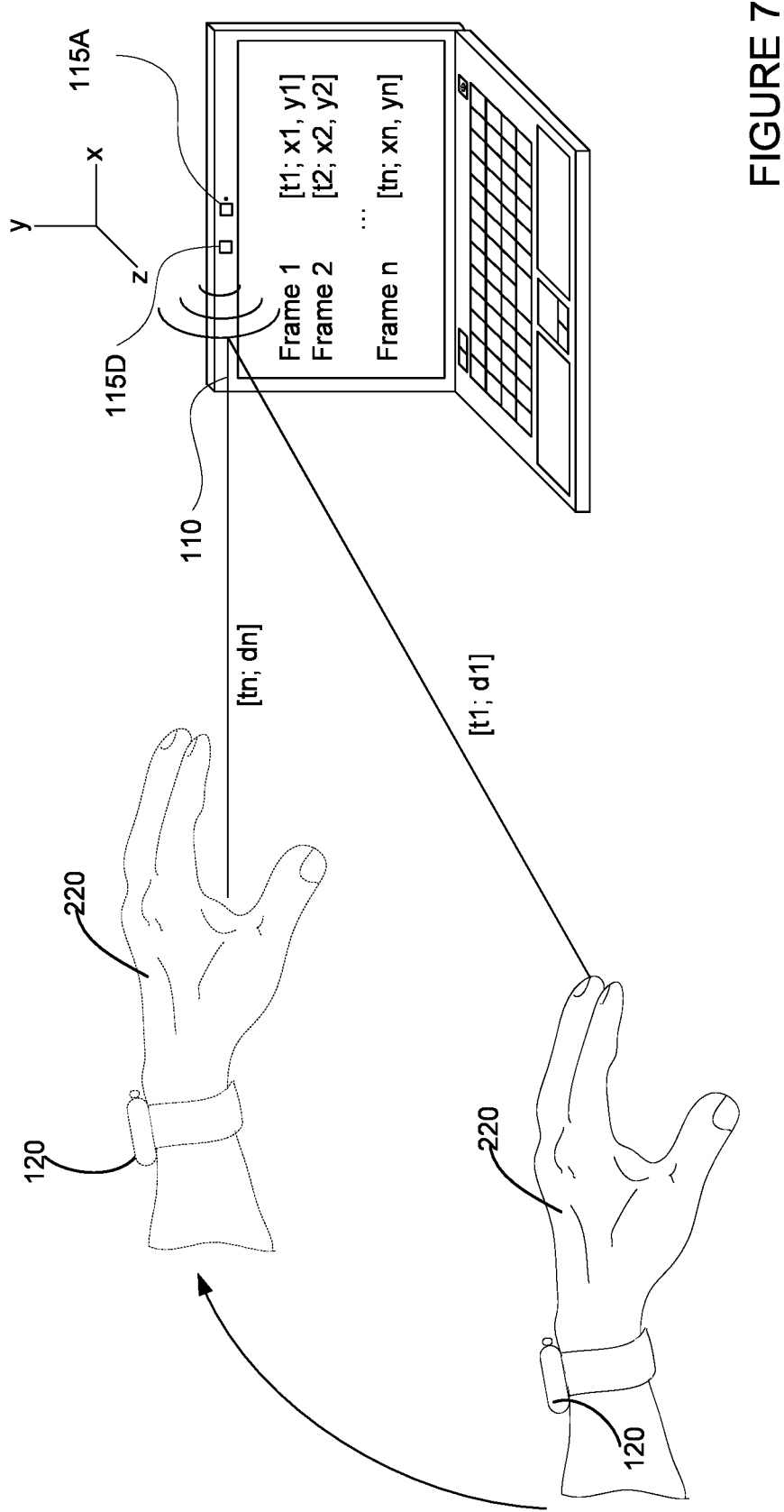
FIG. 7 illustrates an example of detecting gestures using radar measurements in accordance with aspects of the disclosure.

In the instance where the user consents to the use of such data, FIG. 7 illustrates an example situation of detecting a gesture using radar measurements in accordance with aspects of the disclosure. FIG. 7 shows the same example motion of the hand 220 in front of computing device 110 as in FIG. 3. As an alternative or in addition to inertial measurements, computing device 110 may use radar measurements to detect gesture.

As described with respect to example systems above, computing device 110 may further include a radar sensor 115D for measuring positions and/or movements of objects in its surroundings. For example, the radar measurements may include positions and/or velocities of objects moving in the surrounding of computing device 110. In some instances, the radar measurements may be two dimensional measurements. In such instances, the two axes may be chosen so that one of the axes correspond to the axis normal to the aperture of camera 115A. This way, the radar measurements may include depth information. For example, FIG. 7 shows radar measurements in directions of x-axis and z-axis. In other instances where the radar measurements are three dimensional measurements, the three axes may be respectively chosen to be parallel to the three axes of the camera 115A. Each radar measurement may be associated with a timestamp, for example the timestamps may be provided by clock 119 of computing device 110. As such, processors 112 may receive from radar sensor 115D a time-based series of radar measurements, for example shown as [t1; (x1, z1), (v_x1, v_z1)], . . . , [tn; (xn, zn), (v_xn, v_zn)].

However, since radar sensor 115D would detect any objects moving in its surrounding, processors 112 may need to determine a set of radar measurements that correspond to the motion of the hand 220, instead of motion corresponding to some other object during the hand motion. For instance, processors 112 may determine a set of radar measurements that match some aspects of the motion data generated based on image data. For example, processors 112 may determine the set of radar measurements by matching values for the x-coordinate in the radar measurements to the values for the x-coordinate in the positions of the hand 220 generated based on image data.

Since the timestamps for the radar measurements and the image data are both provided by clock 119, there may not be a need to synchronize the timestamps. However, alternatively or additionally, the radar measurements may be taken by a radar sensor in wearable computing device 120, and sent to the processors 112. In such instances, the timestamps for the radar measurements may be provided by clock 129, and therefore may need to be synchronized with image data as described above with respect to FIG. 3. Further in such instances, transformations may need to be determined between a coordinate system of the radar sensor on the wearable computing device 120 and the coordinate system of computing device 110 as described above with respect to FIG. 3.

Processors 112 may combine the radar measurements with the motion data generated based on image data in any of a number of ways. For instance, the combined motion data for each frame may include a position with depth information, such as [t1; x1, y1, z1], where z1 is a radar measurement. Further, where there may be more radar measurements than frames of image data, the additional radar measurements may be used for interpolating information on intermediate movements of the hand 220 between two consecutive frames. For another instance, the combined motion data may include a position and a velocity, such as [t1; (x1, y1, z1), (v_x1, v_z1)], where z1, v_x1, and v_z1 are radar measurements.

As described with respect to FIG. 3, based on the recognized portion of the user's body corresponding to a gesture to perform a command and the combined motion data, processors 112 may detect the gesture provided by the user. Once a gesture provided by the user 210 is detected, processors 112 may determine whether the gesture corresponds to a user command, such as a user command stored in memory 114 of computing device 110. If so, processors 112 may control one or more functions of the computing device 110 based on the user command.

Although each of the examples of FIGS. 3-7 describes combining image data with one other type of data for gesture detection, any of a number of combinations of the various types of data described above may be used for gesture detection. For example, processors 112 may combine inertial measurements received from accelerometer 125A, gyroscope 125B, and signal strength measurements from communication module 117. Further, although the examples of FIGS. 3-7 describe some types of sensor data, other types of data may be used additionally or alternatively. For example, processors 112 may combine inertial measurements from accelerometer 125A, gyroscope 125B, and image data from an infrared optical sensor on wearable computing device 120.

Correlations between the image data and other types of data may be determined in any of a number of ways. For instance, synchronization may be performed between image data and sensor data from one sensor of the wearable computing device 120, then applied to all other sensor data from other sensors of the wearable computing device 120. Further in this regard, transformation may be determined between image data and sensor data from one sensor of the wearable computing device 120, then applied to all other sensor data from other sensors of the wearable computing device 120. In other instances, synchronization and/or transformation between the image data and various sensors of the wearable computing device 120 may be performed by comparing the various types of sensor data altogether, in order to achieve more accurate synchronization and/or transformation across multiple sensors.

Figure 8:
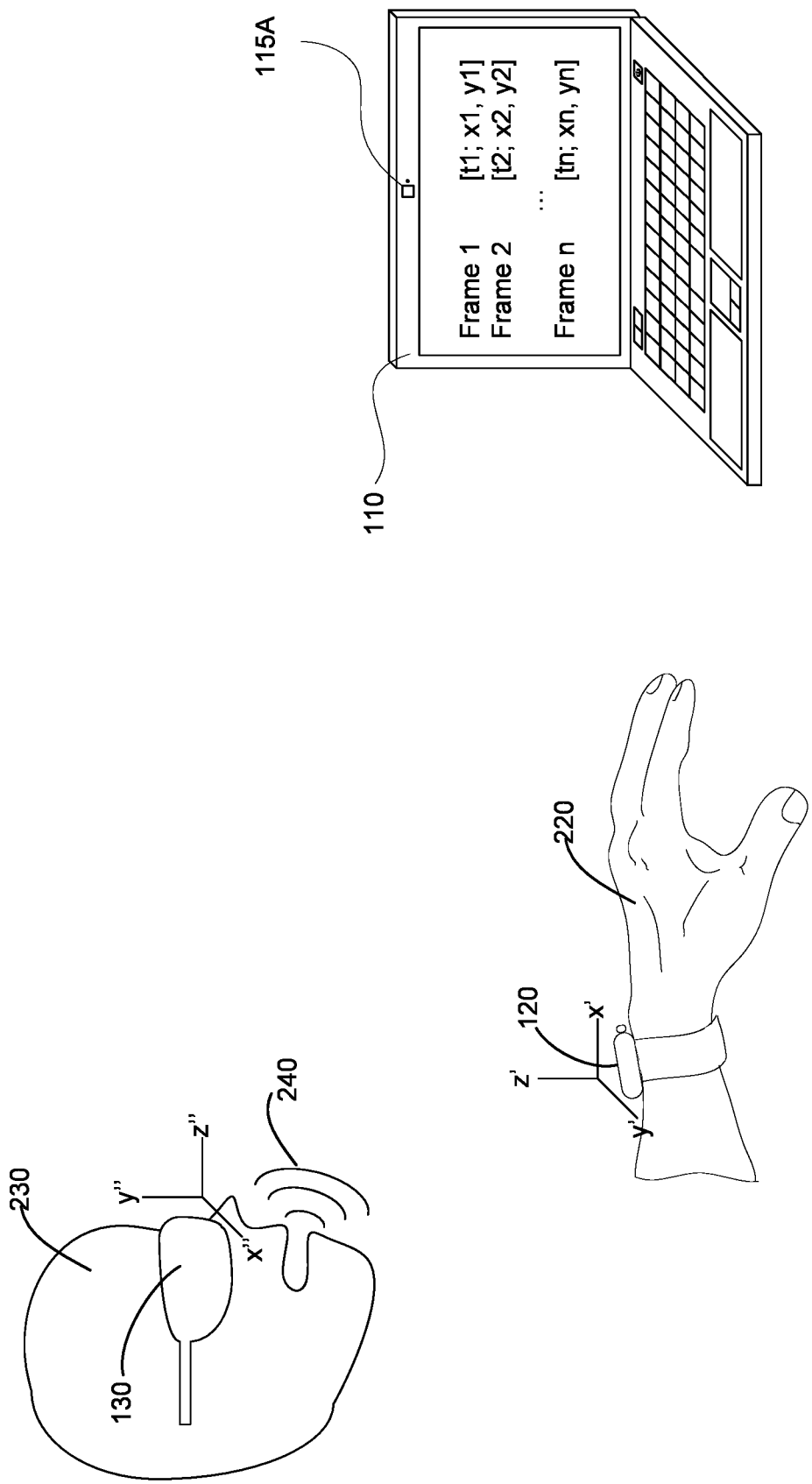
FIG. 8 illustrates an example of detecting gestures using sensor data from multiple wearable devices in accordance with aspects of the disclosure.

FIG. 8 illustrate an example situation of detecting a gesture using data received from multiple wearable computing devices in accordance with aspects of the disclosure. As shown in the example, the wearable computing device 120 may be a smartwatch worn on a wrist of the user 210 and the wearable computing device 130 may be a head-mountable device worn on the head 230 of the user 210. Although FIG. 8 only shows two wearable computing devices, in other examples, sensor data from more than two wearable computing devices may be used for detecting gesture.

In this regard, processors 112 may receive sensor data from wearable computing device 120 and sensor data from wearable computing device 130. The sensor data from wearable computing device 120 and the sensor data from wearable computing device 130 may include sensor data of a same type, or of different types. For example, the sensor data from wearable computing device 120 may include inertial measurements, signal strength measurements, and audio data, while the sensor data from wearable computing device 130 may include signal strength measurements, audio data, and image data. The received sensor data may be associated with timestamps, for example, clock 129 may provide timestamps for sensor data from wearable computing device 120 and clock 139 may provide timestamps for sensor data from wearable computing device 130. The received sensor data may have different coordinate systems, for example, the coordinate system for wearable computing device 120 defined by axes x', y', and z' may be different from the coordinate system for wearable computing device 130 defined by axes x", y", and z".

In order to use the image data and the received sensor data to detect gestures, processors 112 may determine one or more correlations between the image data from camera 115A and the sensor data from computing device 120, as well as one or more correlations between the image data from camera 115A and the sensor data from computing device 130. For instance, the timestamps for the received sensor data from computing device 120 and computing device 130 may both be synchronized with the timestamps for the image data as described above with respect to FIG. 3. For another instance, transformations may be determined between the coordinate system of the computing device 110 and the wearable computing device 120, and between the coordinate system of the computing device 110 and the wearable computing device 130, as described above with respect to FIG. 3. Further in this regard, processors 112 may determine relative positions of the wearable computing devices 120 and 130 in order to determine the transformations. For example, processors 112 may use image processing methods to identify relative positions of the two wearable computing devices 120 and 130 in each frame of the image data. Alternatively or additionally, processors 112 may determine relative positions of the wearable computing devices 120 and 130 by comparing signal strength measurements and/or audio data from the two wearable computing devices 120 and 130.

Processors 112 may combine the received sensor data with the motion data generated based on image data in any of a number of ways. For instance, a motion of the hand 220 may be captured by camera 115A of computing device 110, camera 135A of wearable computing device 130, and accelerometer 125A of wearable computing device 120. For example as described with respect to FIG. 3 above, motion data may be generated based on image data from camera 115A and based on image data from camera 135A. These motion data may be correlated and combined according to their synchronized timestamps. For another example as described with respect to FIG. 3, the motion data may be further correlated and combined with inertial measurements from accelerometer 125A. For another instance, a voice command may be captured by audio sensor 115C of computing device 110, audio sensor 125C of wearable computing device 120, and audio sensor 135D of wearable computing device 130. For example as described with respect to FIG. 6 above, audio data from the three computing devices 110, 120, 130 may be compared in order to determine relative positioning of the three computing devices 110, 120, 130.

As described with respect to FIG. 3, processors 112 may use the combined motion data to determine a gesture provided by the user. Once a gesture provided by the user 210 is detected, processors 112 may determine whether the gesture corresponds to a user command, such as a user command stored in memory 114 of computing device 110. If so, processors 112 may control one or more functions of the computing device 110 based on the user command.

Figure 9:
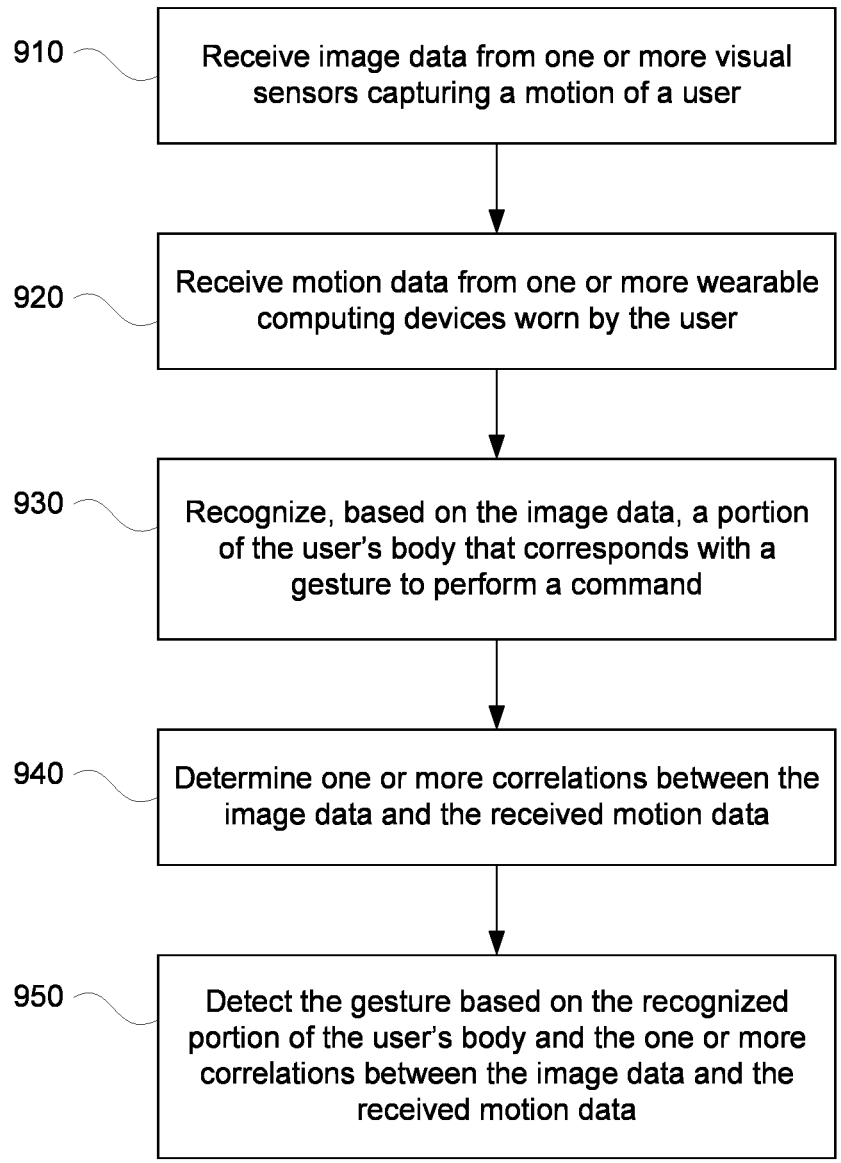
FIG. 9 is a flow diagram in accordance with aspects of the disclosure.

FIG. 9 shows an example flow diagram that may be performed by one or more processors, such as one or more processors 112 of computing device 110. For example, processors 112 of computing device 110 may receive data and make various determinations as shown in the flow diagram. Referring to FIG. 9, in block 910, image data capturing a motion of a user may be received. In block 920, motion data from one or more wearable computing devices worn by the user may be received. In block 930, a portion of the user's body that corresponds to a gesture to perform a command may be recognized based on the image data. In block 940, one or more correlations between the image data and the received motion data may be determined. In block 950, the gesture may be detected based on the recognized portion of the user's body and the one or more correlations between the image data and the received motion data.

The technology is advantageous because, among other reasons, it allows a system with limited sensors to accurately determine user input provided as complex and fast gestures. By correlating inertial measurements from wearable devices to image data captured by the system, the image data may be supplemented with depth and rotation information. When the image data is taken at a lower frequency than the inertial measurements, information on intermediate movements of the user between consecutive frames of image data may be more accurately interpolated, thus increasing the accuracy of the system's interpretation of user input. Features of the technology further provides for using other types of data for detecting gesture, such as signal strength measurements, audio data, and radar measurements. Additionally, many users may find the technology relatively easy to use since the wearable device may already be paired to the system using second factor authentication.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, first audio data from a first audio sensor of a first computing device worn by a user, the first audio data being associated with a voice command generated by the user as the user makes a gesture with a hand of the user;
receiving, by the one or more processors, second audio data from a second audio sensor of a second computing device, the second audio data being associated with the voice command;
comparing, by the one or more processors, the first audio data with the second audio data in order to determine relative distances of the hand of the user to the second computing device;
detecting, by the one or more processors, the gesture based, at least in part, on the relative distances of the hand of the user to the second computing device;
determining, by the one or more processors, whether the gesture corresponds to a user command stored in a memory; and
controlling, by the one or more processors, one or more functions of the second computing device based on the user command.

2. The method of claim 1, wherein the first audio data includes information regarding volume and frequency of the voice command.

3. The method of claim 1, wherein the first audio data is associated with timestamps provided by a first clock of the first computing device.

4. The method of claim 3, wherein the first audio data is a time-based series of audio data.

5. The method of claim 4, wherein the second audio data is associated with timestamps provided by a second clock of the second computing device.

6. The method of claim 5, wherein the second audio data is a time-based series of audio data.

7. The method of claim 6, wherein the timestamps provided by the first and second clocks are synchronized.

8. The method of claim 1, further comprising, when the audio first data decreases in volume between a first time and a second time, but the second audio data remains unchanged between the first time and the second time, determining that the hand of the user has moved closer to the second computing device between the first time and the second time.

9. The method of claim 1, further comprising, when the first audio data increases in volume by a predetermined amount between a first time and a second time, but the second audio data increases in volume by an amount less that the predetermined amount between the first time and the second time, determining that the hand of the user has moved away from the second computing device between the first time and the second time.

10. A method, comprising:
receiving, by one or more processors, sensor data from one or more sensors of a first computing device capturing information indicating a motion of a user, the sensor data including a set of data elements associated with a first coordinate system, each data element in the set having a respective timestamp;
receiving, by the one or more processors, sensor information from a second computing device worn by the user, the sensor information including a set of motion data associated with a second coordinate system, each motion data element in the set having a respective timestamp associated with the second computing device;
determining, by the one or more processors, a correlation between the sensor data and the motion data based on respective timestamps of two or more data elements in the set of data elements and respective timestamps of two or more motion data elements in the set of motion data;
detecting, by the one or more processors, a gesture by the user based on the correlation between the sensor data and the motion data, in accordance with movement of the user between at least a sequential pair of timestamps;
determining, by the one or more processors, that the gesture corresponds to a user command; and
effecting, by the one or more processors, control of the first computing device in response to the user command.

11. The method of claim 10, wherein the correlation between the sensor data and the motion data is based on a transformation between the first coordinate system and the second coordinate system.

12. The method of claim 10, further comprising:
receiving, by the one or more processors, radar measurements from at least one of the first computing device or the second computing device,
wherein the detecting the gesture by the user is further based on the received radar measurements.

13. The method of claim 10, further comprising:
detecting, by the one or more processors, the second computing device in a subset of frames of image data; and
determining an orientation of the second computing device in the subset of frames of image data.

14. The method of claim 10, wherein the detecting the gesture by the user includes determining a position or movement of a portion of the user's hand.

15. The method of claim 14, wherein the portion of the user's hand includes one or more fingers of the user's hand.

16. The method of claim 10, further comprising:
determining, by the one or more processors, an orientation of the second computing device,
wherein the detecting the gesture is further based on the orientation of the second computing device.

17. A system, comprising:
a memory configured to store a user command; and
one or more processors coupled with the memory, the one or more processors being configured to:
receive first audio data from a first audio sensor of a first computing device worn by a user, the first audio data being associated with a voice command generated by the user as the user makes a gesture with a hand of the user;
receive second audio data from a second audio sensor of a second computing device, the second audio data being associated with the voice command;
compare the first audio data with the second audio data in order to determine relative distances of the hand of the user to the second computing device;
detect the gesture based, at least in part, on the relative distances of the hand of the user to the second computing device;
determine whether the gesture corresponds to the user command; and control one or more functions of the second computing device based on the user command.

18. The system of claim 17, wherein the first audio data includes information regarding volume and frequency of the voice command.

19. The system of claim 17, wherein:
the first audio data is associated with timestamps provided by a first clock of the first computing device; and
the second audio data is associated with timestamps provided by a second clock of the second computing device.

20. The system of claim 19, wherein:
the first audio data is a time-based series of audio data; and
the second audio data is a time-based series of audio data.

21. The system of claim 17, wherein the one or more processors are processors of the first computing device.

22. The system of claim 17, wherein the one or more processors are processors of the second computing device.

23. A system, comprising:
a memory configured to store a user command; and
one or more processors coupled with the memory, the one or more processors being configured to:
receive sensor data from one or more sensors of a first computing device capturing information indicating a motion of a user, the sensor data including a set of data elements associated with a first coordinate system, each data element in the set having a respective time stamp;
receive sensor information from a second computing device worn by the user, the sensor information including a set of motion data associated with a second coordinate system, each motion data element in the set having a respective timestamp associated with the second computing device;
determine a correlation between the sensor data and the motion data based on respective timestamps of two or more data elements in the set of data elements and respective timestamps of two or more motion data elements in the set of motion data;
detect a gesture by the user based on the correlation between the sensor data and the motion data, in accordance with the motion of the user between at least a sequential pair of timestamps;
determine that the gesture corresponds to the user command; and
effect control of the first computing device in response to the user command.

\* \* \* \* \*